Figure 1:
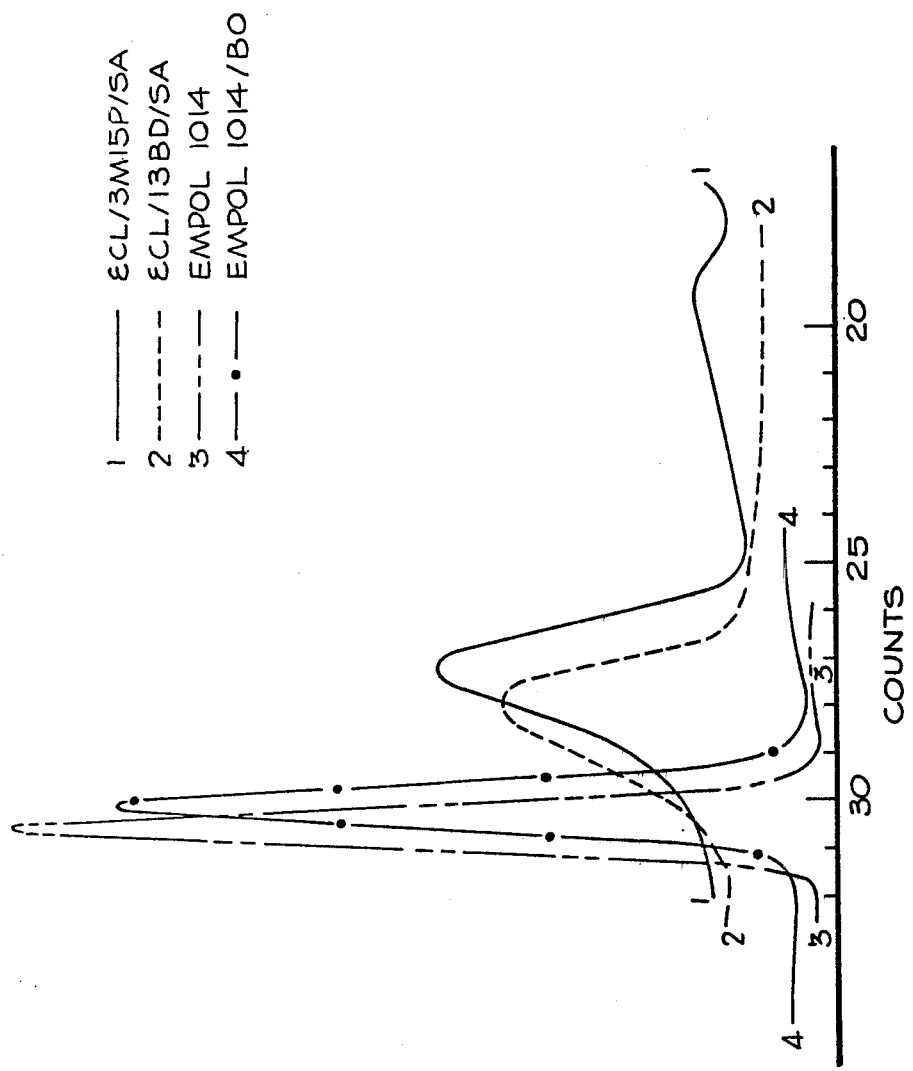

United States Patent [19]

Tremblay

[11] 4,430,131
[45] Feb. 7, 1984

[54] POLYURETHANE BINDERS

[75] Inventor: Meude Tremblay, Charlesbourg, Canada

[73] Assignee: Her Majesty the Queen in right of Canada, Ottawa, Canada

[21] Appl. No.: 318,804

[22] Filed: Nov. 6, 1981

Related U.S. Application Data

[62] Division of Ser. No. 123,948, Feb. 25, 1980.

[51] Int. Cl.³ .................. C06B 33/02; C06B 33/06; C08G 18/08; C08L 75/06
[52] U.S. Cl. ................................ 149/19.4; 149/76; 149/114; 528/279; 528/296; 528/354; 528/355; 525/440; 524/284
[58] Field of Search .......... 528/279, 296, 354, 355, 528/357; 525/440, 421, 424; 149/19.4, 76, 114; 524/284; 523/180

[56] References Cited

U.S. PATENT DOCUMENTS

| | | | |
|---|---|---|---|
| 2,914,556 | 11/1959 | Hostettler et al. | 560/185 |
| 2,962,524 | 11/1960 | Hostettler et al. | 560/185 |
| 2,977,385 | 3/1961 | Fowler et al. | 560/89 |
| 3,654,347 | 4/1972 | Kincaid et al. | 560/185 |
| 3,692,597 | 9/1972 | Brockway et al. | 149/19.4 |
| 3,811,967 | 5/1974 | Strickler et al. | 149/19.4 |
| 4,023,994 | 5/1977 | Arendale | 149/19.4 |
| 4,062,887 | 12/1977 | Chang et al. | 560/185 |
| 4,130,532 | 12/1978 | Lamb | 560/185 |

FOREIGN PATENT DOCUMENTS

| | | | |
|---|---|---|---|
| 954305 | 9/1974 | Canada | 149/19.4 |
| 1326721 | 8/1973 | United Kingdom | 149/19.4 |

*Primary Examiner*—Allan Lieberman
*Attorney, Agent, or Firm*—Cushman, Darby & Cushman

[57] ABSTRACT

The invention disclosed relates to novel ε-caprolactone co-polyesters which when combined with diisocyanates are useful as binders in solid urethane-type propellant formulations. Said co-polyesters are prepared by the reaction, (in the presence of a catalyst for the reaction) and a dicarboxylic acid.

9 Claims, 2 Drawing Figures

POLYURETHANE BINDERS

This is a division of application Ser. No. 123,948 filed Feb. 25, 1980.

This invention relates to a new class of polyesters and to novel polyurethane-type elastomer binders useful in solid propellants, formed by reacting the novel polyesters with a diisocyanate.

Recently, a polyurethane-type elastomer binder has been developed for use in solid propellants. The binder is synthesized by reaction of a liquid polyester with a diisocyanate.

According to structure and molecular weight, the known polyesters presently employed are viscous liquids, solids resins or wax-like products. Some of these known polyesters are hydroxy-terminated, having a molecular weight of about 2000, and are obtained through the polymerization of a mixture of ε-caprolactone and ε-methyl-ε-caprolactone in the presence of ethylene glycol or of glycerol. These polyesters have been used in the manufacture of polyurethane foam rubber.

Hydroxy-terminated polyesters are of specific interest in binders for solid propellants since they are compatible with cyclotetramethylenetetranitramine (HMX), nitrocellulose and nitro plasticizers commonly used in solid propellants. They also exhibit good hydrolytic stability, do not require anti-oxidants and give good adhesive properties to a solid load. Moreover, due to the polymerization method, these polyesters have very low acidity and a very low moisture content. These properties make it possible to obtain aluminized propellant compositions containing 80% solids, exhibiting a specific impulse of 272 seconds. However, these hydroxy-terminated polyesters are generally solids melting at approximately 55°-60° C. or liquids too viscous to accept solid loading of more than 80%.

In an attempt to overcome these disadvantages, synthesis of copolymers of lactones e.g. ε-caprolactone with other monomers has been carried out, in an attempt to obtain hydroxy-terminated polyesters having lower viscosity at ambient temperature and a glass transition temperature lower than the homopolymer. It is believed that the use of a comonomer of a different structure to that of the ε-caprolactone, by introducing substitution groups in the co-polymer, creates a certain amount of disorder in the polymeric chain and prevents solidification of the co-polyester, most likely by lowering the Van der Waals force of the hydrogen bonds.

At present, this type of hydroxy-terminated polyester, specifically polylactone polyols, are used in the synthesis of polyurethane elastomers. For example, the NIAX ® polyols PCP0240 and PCP0300 are used as diols and triols, respectively, in elastomeric binding agents for solid propellants. However, PCP0240 has a wax-like consistency at ambient temperature, melts at temperature above 50° C. and has a viscosity of 0.65 N.s/m² at 55° C.

PCP0300 is liquid at ambient temperature and has a viscosity of 22.5 N.s/m² at 20° C. The high viscosity of these products does not allow for the mixing of aluminized propellant compositions which contain more than 80% solids. Moreover, the glass transition temperature (Tg) of polyurethane elastomers obtained from these products is approximately −70° C., i.e. lower than that of polyoxypropylene (−40° C.) and almost as low as polybutadienes (−78° C.).

According to one aspect of the invention, novel ε-caprolactone co-polyesters of structural formula I are contemplated,

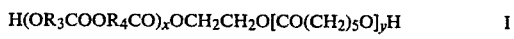

$$H(OR_3COOR_4CO)_xOCH_2CH_2O[CO(CH_2)_5O]_yH \quad \quad I$$

wherein $R_3$ is the residual structure of a diol of structural formula II or a dehydrated derivative thereof

$$HO-R-OH \quad \quad II$$

wherein R is an alkyl group containing 1 to 8 carbon atoms or an alkyl group containing 1–12 carbon atoms having a nitrogen atom in its backbone; wherein $R_4$ is the residual structure of a diacid of structural formula III or a dehydrated derivative thereof

$$HOOC(CH_2)_mCOOH \quad \quad III$$

wherein m is an integer from 1 to 36;
wherein x is an integer from about 1 to about 10; and
wherein y is an integer from about 1 to 10.

According to another aspect of the invention, a process for the preparation of co-polyester diols of structural formula I is also contemplated

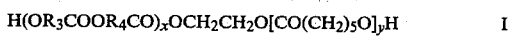

$$H(OR_3COOR_4CO)_xOCH_2CH_2O[CO(CH_2)_5O]_yH \quad \quad I$$

which comprises (a) reacting ε-caprolactone or an ε-caprolactone polymer with the reaction product of (i) a diol of structural formula II or a dehydrated derivative thereof

$$HO-R-OH \quad \quad II$$

wherein R is an alkyl group containing 1 to 8 carbon atoms or an alkyl group containing 1–12 carbon atoms having a nitrogen atom in its backbone; and (ii) a di-carboxylic acid of structural formula III or a dehydrated derivative thereof

$$HOOC(CH_2)_mCOOH \quad \quad III$$

wherein m is an integer from 1 to 36; wherein $R_3$ is the residual structure of a diol of structural formula II or a dehydrated derivative thereof, $R_4$ is the residual structure of a diacid of structural formula III or a dehydrated derivative thereof and x and y are integers of about 1–10 and when (i) is an epoxide and (ii) is an anhydride, the reaction is effected in the presence of a primary diol as co-catalyst, or (b) reacting ε-caprolactone with another lactone, in the presence of a primary diol as co-catalyst, wherein $R_3$ and $R_4$ are derived from the residual structure of said another lactone and x and y are integers of about 1–10.

The primary diol e.g. ethylene glycol, is not a true "catalyst" since a reaction does occur between the diol and the monomer and is therefore referred to as a "co-catalyst."

According to yet another aspect of the invention, novel polyurethane binders useful in the production of solid propellants are contemplated, said binders being formed by reacting one of the aforementioned novel polyesters with a diisocyanate e.g. isophorone diisocyanate (IPDI).

According to yet another aspect of the invention solid propellants of high solids loading are contemplated comprising 12% w/w of a novel polyurethane binder as mentioned above and 88% w/w solids including ammonium perchlorate and aluminum.

1.6 to 1.8, a Tg of approximately −70 and a viscosity of 2.3 N.s/m² at 50° C. (see table I).

TABLE I

Properties of copolyester-amine diols

ε-caprolactone: 1.0 mole
EHPb: lead 2-ethylhexanoate Catalyst

| Test No | Monomer Name | EHPb Mole | Acid No. % weight | OH mg KOH/g | Equiv. meq/g | Mvpo g | Viscosity at 50° C. N·s/m² | Tg °C. |
|---|---|---|---|---|---|---|---|---|
| 4 | Polyesteramine (N8) | 0.05 | 0.06 | 5.6 | 0.420 | 1920 | 2920 | 2.33 | −71 (41) |
| 8 | N—Methyl diethanolamine | 0.059 | 0.1 | 1.4 | 0.945 | 1030 | 1600 | (solid) | −74 |

Figure 2:
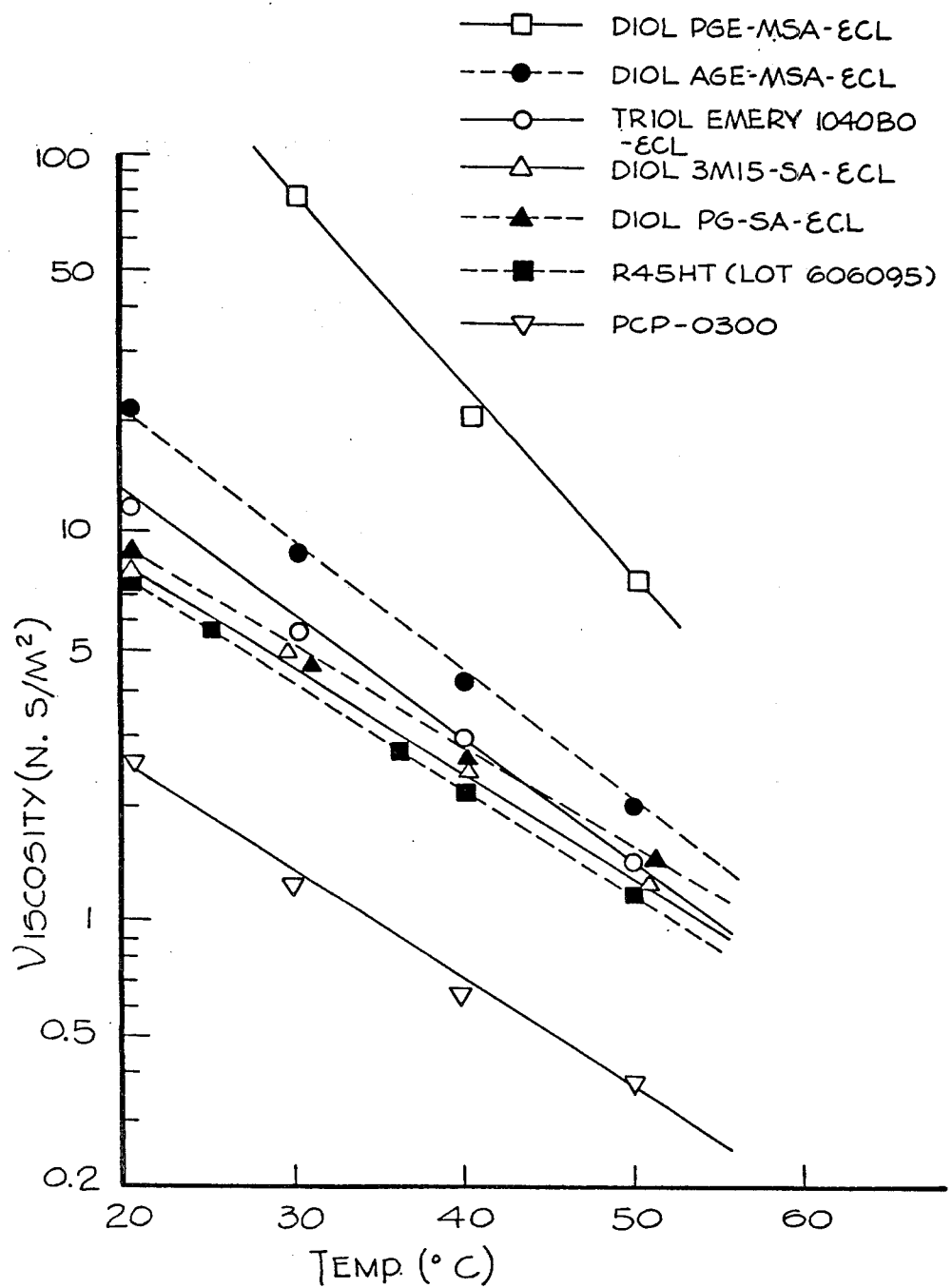

In the drawing which illustrates embodiments of the invention,

FIG. 1 is a graph illustrating the determination of molecular weight, by GPC, of various novel polyesters according to the invention, and FIG. 2 is a graph illustrating the viscosity at various temperatures of novel polyesters according to the invention.

FIG. 1 demonstrates the homogeneity of the different compounds synthesized and enables determination of the molecular weight by GPC of the different polyester diols. The abscissa is the time elapsed (count) to elute the molecule of a definite size, while the ordinate represents a measure of the absorbance of elutate by infra-red or with refractive index determinations. The graphical results are shown in the tables under weight average ($M_w$) and number average ($M_n$) molecular weights.

The viscosity of different synthetic polymers at several temperatures is shown in FIG. 2 and was compared to either Niax Polyol PCP-0300 or Hydroxy terminated Polybutadiene R45-HT. The abcissa on the graph gives the temperature in Celsius (°C.) while the ordinate, the viscosity in Newton × second/meter square (N.s/m²) is identical to Pascal × second (Pa.s) and ten times greater than poise.

The following examples further illustrate embodiments of the invention.

The use of N-methyl-diethanolamine or of polyesteramine (N-8) (formed from sebacic acid and N-methyl diethanolamine) as initiator of ε-caprolactone polymerization, has resulted in hydroxyl-terminated polyesteramines, that are solid at 50° C.

EXAMPLE I

Preparation of copolyester diols from (N-8) polyesteramine diol and ε-caprolactone.

A mixture of ε-caprolactone (20 moles) with 1.0 mole of (N-8) polyesteramine diol (produced by the reaction of sebacic adid with (i) N-methyl-diethanolamine or with (ii) N-methyl-diethanolamine in the presence of a catalyst (lead-2-ethylhexanoate, or tetraoctyleneglycol titanate, 1%) is heated under a nitrogen atmosphere. Solid products at ambient temperature are obtained. The copolyester diols had a functionality varying from Preparation of a copolyester diol or triol from Empol ® dimer 1014 or Empol ® trimer 1040 and ε-caprolactone The copolymerization of ε-caprolactone and a butylene oxide derivative of Emery Empol dimer 1014 or Emery Empol trimer 1040 gives liquid copolyester diols or triols. Empol is a trademark for aliphatic dimer acids of 36 carbon atoms and trimer acids of 54 carbon atoms.

EXAMPLE 2

Diol Preparation 10 moles of ε-caprolactone are made to react with one mole of butyleneoxide derivative of Empol dimer acid 1014 (Emery Industries Inc.). The reaction is completed after 24 hours at 180° C. in nitrogen atmosphere, in the presence of 0.60% lead 2-ethylhexanoate as catalyst. The product obtained has an hydroxyl equivalent of 1018 and a average molecular weight (Mvpo) of 1950. It has a wax-like appearance at ambient temperature and a viscosity of 0.66 N.s/m² at 50° C. The glass transition temperature (Tg) is −70° C.

Triol Preparation

The butylene oxide derivative of the Empol trimer 1040 is substituted for the derivative of Empol dimer 1014 in a mixture described in the preceding paragraph and a triol having an hydroxyl equivalent of 783 and a Mvpo of 2190 is obtained. The viscosity of this product at 20° C. is 10.1 N.s/m² and the Tg −68° C. (See table II).

The butylene oxide derivative of the dimer or trimer acid may be represented as a long chain diol or a triol of general formula:

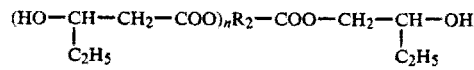

where n=1 for a diol and n=2 for a triol and $R_2$=backbone of 36 carbon atoms of the dimer acid, from Emery Empol 1014 and $R_2$=backbone of 54 carbon atoms of the trimer acid, from Emery Empol 1040.

TABLE II

Properties of copolyester diols or triols derived from Empol products and ε-caprolactone ε-caprolactone: 1.0 mole
EHPb: lead 2-ethylhexanoate (0.06%)

| Test No. | Monomer Name | Mole | Acid No. mg KOH/g | OH meq./g | Equiv. g | Mvpo g | Viscosity (°C.) N.s/m² | Tg °C. |
|---|---|---|---|---|---|---|---|---|
| 5 | Empol 1014BO | 0.1 | 3.3 | 0.923 | 1018 | 1950 | 0.69(50) | −72 (−43) |
| 6 | Empol 1014BO | " | 3.8 | 0.961 | 1017 | 1920 | 0.63(50) | |
|   | Empol 1040BO | 0.1 | 1.0 | 1.26 | 783 | 2190 | 10.1(20) | −68 |

TABLE II-continued

Properties of copolyester diols or triols derived from Empol products and ε-caprolactone ε-caprolactone: 1.0 mole
EHPb: lead 2-ethylhexanoate (0.06%)

| Test No. | Monomer Name | Mole | Acid No. mg KOH/g | OH meq./g | Equiv. g | Mvpo g | Viscosity (°C.) N.s/m² | Tg °C. |
|---|---|---|---|---|---|---|---|---|
| | | | | | | | 1.14(50) | |

Preparation of a copolyester diol from two lactones ciently integrated into the copolyester to lower the viscosity at 50° C. (See Table III).

TABLE III

Properties of copolyester diols obtained from two lactones

ε: caprolactone: 1 mole; ethylene glycol 0.12 mole:
TOGT: 0.1% in weight

| Test No. | Monomer Name | Mole | Acid No. mg KOH/g | OH meq./g | Equiv. g | Mvpo g | Viscosity (50°) N.s/m² | Tg, °C. t₁ | t₂ | t₃ |
|---|---|---|---|---|---|---|---|---|---|---|
| 18 | γ-butyrolactone | 0.74 | 2.07 | 1.24 | 783 | 1175 | 0.49 | | | |
| 19 | γ-valerolactone | 1.0 | | 1.69 | 590 | 960 | 0.32 | −74 | −49 | −6 |
| 20 | γ-valerolactone | " | 4.89 | 1.76 | 539 | | 0.29 | −78 | −46 | −4 |

The copolymerization of two lactones of different structures was studied first. The copolyester synthesis from ε-caprolactone with γ-butyrolactone

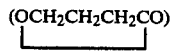

or γ-valerolactone

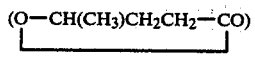

in presence of a cationic catalyst, tetraoctyleneglycol titanate, and a co-catalyst, ethylene glycol, under a pressure of 0.7 MPa, indicates that a small proportion of these lactones is introduced in the copolymer. On the other hand, a lactone formed by a six-membered ring, e.g. γ-valerolactone, copolymerizes with the ε-caprolactone under the same conditions. This product is as crystalline as the caprolactone homopolymer and melts at a temperature of above 50° C.

EXAMPLE 3

Preparation of copolyester diols from two lactones

A monocyclic ether formed by a seven-membered ring, e.g. ε-caprolactone, is copolymerized at 180° C. under a nitrogen atmosphere, in presence of 0.1% tetraoctyleneglycol titanate catalyst, with a six-membered ring lactone, γ-valerolactone, and two pentagonal lactones respectively, γ-butyrolactone and γ-valerolactone.

While the γ-valerolactone easily copolymerizes with ε-caprolactone creating a solid product, the pentagonal lactones are difficult to polymerize alone, but in presence of the ε-caprolactone these two lactones are suffi- Preparation of copolyester diols from an anhydride, a cyclic ether and ε-caprolactone The reaction of a cyclic ether with a cyclic anhydride forms a polyester. A new family of co-polyesters obtained from a mixture of ε-caprolactone, a cyclic ether and a cyclic anhydride in the presence of a co-catalyst such as ethylene glycol, and an initiator, such as tetraoctyleneglycol titanate, results in the co-polyester diol of the following probable structure, as for example the polycaprolactone-co-3-phenoxypropylene-1,2-cyclohexene dicarboxylate diol:

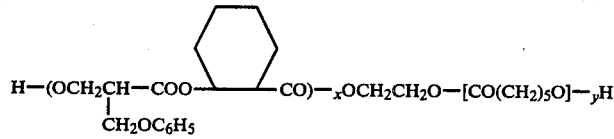

These copolyesters have a structure which tends to prevent crystallization and are liquid at ambient temperature. While ε-caprolactone polymerizes into a block and while its polymerization rate is independent of the concentration of this monomer, the polymerization rate of the second monomer is governed by the rate of condensation of the anhydride with the epoxide.

EXAMPLE 4

Preparation of a terpolyester diol from an anhydride, a cyclic ether and ε-caprolactone A mixture of an epoxide such as phenylglycidyl ether (PGE), 1,2-epoxycyclohexene (ECH) or allylglycidyl ether (AGE) (1.0 mole), a dicarboxylic acid anhydride such as cis-1,2-cyclohexanedicarboxylic anhydride (CHDA), methylsuccinic anhydride (MSA), 3-methylglutaric anhydride (MGA), pyrotartaric anhydride (PTA), and phthalic anhydride (PA) (1.0 mole) and ε-caprolactone (1.0 mole), is heated to 140°–180° C. in nitrogen atmosphere in the presence of a catalyst tetraoctylene glycol titanate (TOGT), tin dibutyldilaurate (DGSnDL) or lead 2-ethyl hexanoate (EHPb), 1.0% in weight of the monomers; and of a co-catalyst (ethylene glycol, 0.12 mole). The percentage of reactive anhydride is determined by calculating the acid number. An equimolecular mixture of epoxide and anhydride results in a co-polyester with carboxyl terminated groups, while an excess of epoxide results in a diol (See Table V). The rate of reaction determined by the reduction of the acid number is shown in Table VI. The rate of disappearance of ε-caprolactone is measured by gas chromatography.

The polymer obtained by the reaction of PGE, CHDA and ε-caprolactone, polycaprolactone-co-3-phenoxypropylene-1,2-cyclohexylene-dicarboxylate is a homogeneous product, while polymer obtained from AGE, MSA and ε-caprolactone, polycaprolactone-co-3-allyloxy-1,2-propylene methylsuccinate is a mixture of two products.

The product obtained from ECH, MSA and ε-caprolactone i.e. polycaprolactone-co-1,2-cyclohexylene methylsuccinate is also a homogeneous product and the molecular weights are calculated by GPC (See Table VII).

EXAMPLE 5

Preparation of a block co-polyester diol, from a diacid, a diol, and a polymer of ε-caprolactone, namely, polycaprolactone (PCP)

A mixture of a diol (1,2-propanediol, 1.0 mole), a dicarboxylic acid (adipic, sebacic, 1.0 mole) and polycaprolactone (PCP 0530, 1.0 mole) is heated at 200°–225° C. under a nitrogen atmosphere in the presence of a catalyst (TOGT, 1 ppm) until all the acid is completely eliminated. The residual monomers are evaporated by heating under reduced pressure. The residual acid contents, hydroxyl group concentration, molecular weight are then determined by vapour phase osmometer and chromatography on a permeable gel as well as the viscosity. The results are shown in Table VIII.

TABLE VI-continued

Rate of reaction of polyester diols
Ratio in ether/anhydride/ε-caprolactone: 1.5/1.0/1.0

| Test No. | Reagent | Time sec × $10^{-3}$ | Temp. C.° | Anhydride % |
|---|---|---|---|---|
| | | 14.4 | | 8.2 |
| | | 18.0 | | 6.4 |
| | | 21.6 | | 2.2 |
| | | 25.2 | | 1.2 |
| | | 32.4 | | 0.2 |
| 37 | PGE/MSA/εCL/DBSnDL | 7.2 | 180 | 72.9 |
| | | 21.6 | | 34.9 |
| | | 32.4 | | 18.9 |
| | | 34.2 | | 15.7 |
| | | 43.2 | | 11.8 |
| | | 54.0 | | 8.8 |
| | | 64.8 | | 5.7 |
| | | 75.6 | | 2.8 |
| | | 86.4 | | 1.0 |
| 38 | PGE/MSA/εCL/TOGT | 7.2 | 180 | 50.6 |
| | | 21.6 | | 26.2 |
| | | 32.4 | | 7.5 |
| | | 34.2 | | 5.5 |
| | | 43.2 | | 1.3 |
| | | 54.0 | | 0.4 |
| 35 | AGE/MSA/εCL/TOGT | 0.9 | 140 | 98.3 |
| | | 1.8 | | 89.7 |
| | | 2.7 | | 83.4 |
| | | 5.4 | | 72.3 |
| | | 8.1 | | 62.6 |
| | | 13.5 | | 46.7 |
| | | 21.6 | | 33.9 |
| | | 28.8 | | 27.7 |
| | | 46.8 | | 18.2 |

TABLE VII

Characterization of polycaprolactone diols and copolyester diols by GPC

| SAMPLE | Mw | MOH | Equiv. OH g | Mn | Mw/Mn |
|---|---|---|---|---|---|

TABLE V

Properties of terpolymer polyesters

| Test No. | Monomer Name | Molar proportion | Catalyst 0.1% Name | Terminal Group | Acid No. mg KOH g | OH meq. g | Equiv. g | Mvpo g | Viscosity N.s/m² 20° C. | Viscosity N.s/m² 50° C. | Tg C.° |
|---|---|---|---|---|---|---|---|---|---|---|---|
| 22 | PGE-CHDA-εCL | 1:1:1 | TOGT | COOH | 23.8 | | 2350 | 1680 | | 114 | −5 |
| 23 | PGE-MGA-εCL | 1:1:1 | " | " | 29 | | 1935 | 1550 | 156.9 | 7.27 | −22 |
| 24 | PGE-3MGA-εCL | 1:1:1 | " | " | 19 | | 2940 | | 172 | 0.95 | −26 |
| 25 | PGE-MSA-εCL | " | " | " | 21.6 | | 2600 | 1690 | 218.9 | 9.6 | −21 |
| 26 | PGE-MSA-εCL | " | " | " | 27.8 | | 2015 | | 298.5 | 9.03 | |
| 27 | " | " | DBSnDL | " | 21.1 | | 2650 | | 538.3 | 21.0 | |
| 28 | " | 1:5:1:1 | TOGT | OH | 0.49 | | | 1496 | 323 | 11.3 | |
| 29 | " | " | DBSnDL | " | 0.45 | | | 1656 | 357 | 12.2 | −19 |
| 30 | " | " | EHPb | " | 0.13 | | | 1611 | 284 | 9.3 | |
| 31 | ECH-MSA-εCL | 1:1:1 | DBSnDL | COOH | 69.1 | | 810 | | 185 | 7.79 | |
| 32 | " | 1:5:1:1 | TOGT | " | 22.8 | | 2460 | | 580 | 14.5 | −18 |
| 34 | PGE-MSA-εCL | 1:1:1 | " | " | 37.3 | | 1505 | | | 76.3 | |
| 33 | AGE-MSA-εCL | " | " | OH | 2.3 | 0.792 | 1200 | 2176 | 21.6 | 2.36 | −53 |
| 35 | " | 1:1:1 | " | " | 2.9 | 0.926 | 1020 | 1842 | 17.9 | 2.26 | |

TABLE VI

Rate of reaction of polyester diols
Ratio in ether/anhydride/ε-caprolactone: 1.5/1.0/1.0

| Test No. | Reagent | Time sec × $10^{-3}$ | Temp. C.° | Anhydride % |
|---|---|---|---|---|
| 36 | PGE/MSA/εCL/EHPb | 3.6 | 180 | 22.1 |
| | | 7.2 | | 18.9 |
| | | 11.7 | | 11.6 |

| | Mw | MOH | | Mn | Mw/Mn |
|---|---|---|---|---|---|
| Niax Polyol PCP 0200 | 1184 | 530 | | 848 | 1.40 |
| Niax Polyol PCP 0210 | 1743 | 830 | | 1160 | 1.50 |
| Niax Polyol PCP 0230 | 2690 | 1250 | | 1887 | 1.42 |
| Niax Polyol PCP 0240 | 3840 | 2000 | | 2587 | 1.49 |
| Niax Polyol PCP 0260 | 5960 | 3000 | | 4182 | 1.43 |
| Standard (Mw: 33000, Mn 10700) | 19810 | | | 10700 | 1.85 |
| Test 22 | 2775 | | 2350 | 1753 | 1.58 |
| Test 25 | 3144 | | 2600 | 1557 | 2.02 |
| Test 32 | 1948 | | 2460 | 1029 | 1.89 |

TABLE VIII

| Test | Monomer | Polymer | COPOLYESTER DIOLS TEMP. Max C.° | Time Hours | Acid No. mg KOH/g | OH No. meq/g | Equiv. OH g | Mw | Mn | Mvpo g | Viscosity N.s/M² at 20° C. |
|---|---|---|---|---|---|---|---|---|---|---|---|
| 36 | PCP 530, PG, AA TOGT | Block polycaprolactone-co-propylene adipate | 200 | 77 | 0.71 | 1.71 | 590 | | | | 3.0 |
| 37 | PCP 530, PG, AA TOGT | Block polycaprolactone-co-propylene adipate | 195 | 30 | 2.5 | | | | | | 39.7 |
| 39 | ε-CL, PG, AA, TOGT | Sequenced polycaprolactone-co-propylene adipate | 230 | 90 | 0.99 | 0.22 | 4550 | 16348 | 9093 | | 229.0 |
| 41 | ε-CL, PG, SA, TOGT | Sequenced polycaprolactone-co-propylene sebacate | 225 | 80 | 0.41 | 0.95 | 1050 | 4580 | 2900 | 1920 | 9.0 |
| 42 | ε-CL, PG, SA, TOGT | Sequenced polycaprolactone-co-propylene sebacate | 250 | 140 | 0.54 | 0.440 | 2270 | 11800 | 6870 | 3268 | 52.8 |
| 43 | ε-CL, PG, SA, TOGT | Sequenced polycawprolactone-co-propylene sebacate | 220 | 150 | 0.60 | 0.338 | 2960 | 15411 | 8630 | 4389 | 120.0 |
| 78 | ε-CL, 13BD, SA, TOGT | | " | 140 | 1.16 | 0.432 | 2210 | 8490 | 5170 | 2160 | 28.4 |
| 79 | ε-CL, 3M15P, SA, TOGT | | " | " | 0.65 | 0.832 | 1200 | 6130 | 3830 | 1810 | 7.9 |

EXAMPLE 6

Preparation of a sequenced co-polyester diol from a diacid, a diol and ε-caprolactone A mixture of a diol selected from 1,2-propanediol (PG), 1,3-butanediol (13BD) and 3-methyl-1,5-pentanediol (3M15P) (1.1 mole), a dicarboxylic acid (adipic (AA) or sebacic (SA) 1.0 mole) and ε-caprolactone (1.0 mole) is heated to 200°–250° C. in nitrogen atmosphere in presence of a catalyst (TOGT, boron trifluoride). Volatile products are evaporated through vacuum heating at 225° C. The extent of the reaction is measured by the determination of the acid group and the quantity of non-polymerized ε-caprolactone. The hydroxyl concentration, the molecular mass are determined by a vapour phase osmometry and chromatography on a permeable gel, as well as the viscosity (see Table VIII).

Preparation of polyurethane binder from Empol co-polyester diol 1014BO/ε-CL, Empol co-polyester triol 1040BO/ε-CL and a diisocyanate We prepared elastomers from a mixture of Empol® co-polyester diol 1014BO/ε-CL and Empol® co-polyester triol 1040BO/ε-CL. For comparison purposes, an elastomer was made from R45M (trade mark for a hydroxy-terminated polybutadiene sold by Arco Chemical Corp.). These products were transformed into elastomeric polyurethane by reaction with a diisocyanate. The mixtures were poured into Teflon® moulds and placed into a 60° C. oven to constant shore A hardness. The mechanical properties of the binders ($\sigma_m$, $\sigma_r$, $\epsilon_m$, $\epsilon_r$, and E) were measured at ambient temperature (23° C.) using a Instron machine (Instron Canada Ltd., model TTC 1114) on rings manufactured with a punch. These rings had an interior diameter of 3.17 cm. Samples are drawn at a speed of 0.212 cm/s. The effective gauge length of the test tube was 3.50 cm. Mechanical properties are shown in Table IX. The polyester elastomers have an energy comparable to polybutadienes. Exemplified diisocyanate are DDI diisocyanate, a trade mark for an intermediate made from a 36-carbon dimer aliphatic dibasic acid; acid; isophorone diisocyanate (IPDI); and Isonate 901, a trade name for a polyfunctional isocyanate from Upjohn Polymer Chemicals of Kalamazoo, Mich.

In FIG. 1, the compounds analysed by GPC in curves 1 and 2 were obtained by the process reported in Example 6. It is also shown in FIG. 1 that compounds 3 and 4 had much lower molecular weight (higher GPC counts) than copolyester diols (curves 1 and 2). It is also shown that the copolyester diols (curves 1 and 2) are truly copolymer and not a mixture of polymer according to the form of the curves (only one peak). The curves of the additional compounds studied (Emery Empol dimer acid 1014, and hydroxyl terminated Empol 1014/BO) were given for comparison.

Preparation of polyurethane binders from a terpolymer diol, from polycaprolactone triol and from diisocyanate A mixture of terpolymer diol (AGE/PA/ε(CL) and of Niax Polyol triol PCP0300 is mixed with a diisocyanate according to the method described in the preceding paragraph. A mixture of Niax Polyol PCP0240 and PCP0300 was heated with the same isocyanate for comparison purposes. The elastomers obtained have properties similar to those from polybutadienes (Table IX).

TABLE IX

Mechanical properties of polyurethanes from Empol copolyester diol and isocyanates Equivalent weight of R45M (lot 006121): 1420 g; heating time: to constant hardness; heating temperature: 60° C.; isodecyl pelargonate: 25% of the elastomer; equivalent ratio diol/triol: 1.0

| Test No. | Diol Name | Triol Name | Diisocyanate Name | Mole | $\sigma_m$ MPa | $\epsilon_m$ cm/cm | E MPa | Energy J |
|---|---|---|---|---|---|---|---|---|
| 45 | R45M | | DDI | 1.0 | 0.223 | 3.72 | 0.13 | 0.51 |

TABLE IX-continued

Mechanical properties of polyurethanes from Empol copolyester diol and isocyanates Equivalent weight of R45M (lot 006121): 1420 g; heating time: to constant hardness; heating temperature: 60° C.; isodecyl pelargonate: 25% of the elastomer; equivalent ratio diol/triol: 1.0

| Test No. | Diol Name | Triol Name | Diisocyanate Name | Mole | $\sigma_m$ MPa | $\epsilon_m$ cm/cm | E MPa | Energy J |
|---|---|---|---|---|---|---|---|---|
| 46 | Empol 1014BO/εCL | Empol 1040BO/εCL | IPDI | 1.0 | 0.167 | 7.88 | 0.037 | 0.52 |
| 47 | Empol 1014BO/εCL | Empol 1040BO/εCL | IPDI | 1.25 | 0.321 | 2.50 | 0.209 | 0.41 |
| 48 | PCP 0 240 | PCP 0300 | IPDI | 1.00 | 11.7 | 7.50 | 8.43 | 31.5 |
| 49 | AGE-PTA-εCl | PCP 0 300 | IPDI | 1.00 | 0.404 | 1.35 | 0.344 | 0.21 |
| 44 | PG-SA-εCL | | ISONATE901 | 0.80 | | 8.20 | | |
| 66 | εCL-PG-SA | | " | 0.80 | 0.260 | 15.9 | 0.20 | 0.87 |
| 86 | εCL-13BD-SA | | " | | 0.088 | 4.8 | 0.393 | 0.17 |
| 117 | εCL-13BD-SA | | " | 1.20 | 0.330 | 3.7 | 0.19 | 0.59 |
| 147 | εCL-BO-CHDA | | " | 1.20 | 0.306 | 3.8 | 0.11 | 0.40 |

Preparation of propellant from polyesters

The propellant samples were prepared from ammonium perchlorate (mixture of 400, 200 and 17 μm, proportionately weighing 1.7, 2.7 and 1.0 respectively), of aluminum H-15 and of various ingredients used in binders according to a conventional method. The various ingredients were mixed in a vertical-propeller mixer of 500 g (Atlantic Research Corp., Alexandria, (Va.). To the mixture of polyester diol and plasticizer, we added the alumina, the ammonium perchlorate and finally the diisocyanate (table IX) during a three-hour period, mixing constantly at a temperature of 60° C., in a vacuum. The load was poured into a Teflon ® mould, which was then agitated in a vacuum, by a vibrator. It was heated at a constant temperature in an oven, until the hardness of the sample was constant. The propellant test-pieces were then tooled according to JANAF dimensions, and the mechanical properties in traction were determined following the usual method (3). JANAF test-pieces, tooled from propellant blocks were used to determine the mechanical properties at 23° C.

and at −45° C. The mobile apron was moved at a speed of 0.0847 cm/s and at a deformation rate of 0.0123 s$^{-1}$. The effective gauge length of the test-pieces was 8.43 cm. The maximum load and elongation obtained with the test-piece was determined from the tension-deformation curve which was used to calculate strain ($\sigma_m$) to maximal elongation ($\epsilon_m$). The initial modulus was calculated from the slope at the beginning of this same curve. Results of mechanical properties of the novel propellants are given in Table X.

Owing to their low viscosity and good compatibility with the plasticizer isodecyl pelargonate, two copolyester binders, polycaprolactone-co-propylene sebacate and polycaprolactone-co-3-methyl pentamethylene sebacate (batch 69, 93, 102, 104 and 105, Table X) yielded propellants containing up to 88%/N of solids. The mechanical properties of these propellants were superior to those obtained from polycaprolactone diols.

TABLE X

Mechanical Properties of Copolyester Propellants

ε-CL/Empol 1014 BO and ε-CL/Empol 1040BO: 0.5 mole each; time: to constant shore A hardness; Curing temperature: 60° C.; solids: 88% (70% AP of 400, 200 and 17 μm in respective weight ratio of 1.7/2.7/1.0 and 18% of Al H-15; Isodecyl pelargonate: 25% of the elastomer.

| | Prepolymer (1.0 mole) | Diisocyanate (mole) | $\sigma_m$ MPa | $\epsilon_m$ cm/cm | E MPa | Energy J |
|---|---|---|---|---|---|---|
| 80 | ε-CL/Empol 1014BO and ε-CL/Empol 1040BO | IPDI | 0.383 | 0.113 | 6.64 | 0.29 |
| 81 | ε-CL/Empol 1040BO | DDI | 0.346 | 0.06 | 9.60 | 0.12 |
| 69 | Diol ε-CL/PG/SA (No 57) | isonate 901 | 0.408 | 0.087 | 9.60 | 0.31 |
| 102 | Diol ε-CL/3M15P/SA (No 79) | isonate 901 | 0.231 | 0.118 | 2.50 | 0.20 |
| 93 | " | IPDI (1.0) | 0.188 | 0.192 | 2.00 | 0.54 |
| 104 | " | isonate 901 (0.8) | 0.199 | 0.097 | 2.43 | 0.122 |
| 105 | " | IPDI (1.2) | 0.352 | 0.124 | 6.15 | 0.66 |

The general structural formula I was deducted from the apparent starting materials as set forth in the examples, giving alternate or block copolymers according to the following Table XI.

TABLE XI

| Epoxides or diols or lactones | | R$_3$ |
|---|---|---|
| 1,2-epoxy cyclohexene (ECH) | yield | 1,2-cyclohexene |
| 4-vinyl-1, 2-epoxy cyclohexene | " | 4-vinyl-1, 2-cyclohexene |
| Allyl-glycidyl ether (AGE) | " | 3-propenyloxy-1, 2-propylene |
| Phenyl glycidyl ether (PGE) | " | 3-phenoxy-1, 2-propylene |
| Polyesteramine diol | " | $CH_2-CH_2-N(CH_3)CH_2CH_2$ |
| N—methyldiethanolamine | " | N—Methyldietheneamine |
| Γ-butyrolactone | " | 1, 3-propylene |
| Γ-valerolactone | " | 1, 3-butylene |
| Propylene oxide | " | 1, 2-propylene |
| Butylene oxide | " | 1, 2-butylene |
| Propylene glycol | " | 1, 2-propylene |

TABLE XI-continued

| 1,3-Butanediol | " | 1, 3-butylene |
|---|---|---|
| 3-Methyl-1, 5-pentanediol | " | 3-methyl-1, 5-pentamethylene |
| Niax polyol PCP 0530 | " | Polycaprolactone |

| Lactones, acids, anhydride | | $R_4$ |
|---|---|---|
| δ-valerolactone | yield | tetramethylene |
| Γ-butyrolactone | " | 1, 3-propylene |
| Γ-valerolactone | " | 1, 3-butylene |
| cis-1,3-cyclohexane dicarboxylic anhydride (CHDA) | " | 1, 2-cyclohexene |
| Methyl succinic anhydride (MSA) | " | 1, 2-propylene |
| Methyl succinic acid | " | 1, 2-propylene |
| 3-methyl glutaric anhydride (MGA) or acid | " | 2-methyl-1,3-propylene |
| Phthallic anhydride (PA) or acid | " | Phenylene |
| Adipic acid (AA) | | tetramethylene |
| Sebacic acid (SA) | | octamethylene $(CH_2)_8$ |
| Empol 1014 | | $C_{36}$ radical |

From the gel permeation chromatography and nuclear magnetic resonance studies we can demonstrate the formation of only one copolyester of the written structure. The "x" units were formed from a diol and a diacid (or the dehydrated derivatives) and the "y" units obtained from the ε-caprolactone monomer.

The embodiments of the invention in which an exclusive property or privilege is claimed are defined as follows:

1. A process for the preparation of a polyurethane binder comprising reacting a diisocyanate with a block or sequenced co-polyester diol of the structural formula I $$H(OR_3COOR_4CO)_xOCH_2CH_2O[CO(CH_2)_5O]_yH \qquad I$$

which comprises simultaneously reacting ε-caprolactone in the presence of a catalyst with
(i) a diol of structural formula II $$HO-R-OH \qquad II$$

as co-catalyst for the reaction wherein R is an alkyl group containing 1 to 8 carbon atoms or an alkyl group containing 1–12 carbon atoms having a nitrogen atom in its backbone; and
(ii) a di-carboxylic acid of structural formula III $$HOOC(CH_2)_mCOOH \qquad III$$

wherein m is an in integer from 1 to 36, and wherein $R_3$ is the residual structure of a diol of structural formula II and $R_4$ is the residual structure of a diacid of structural formula III, and x and y are integers of about 1–10.

2. The process according to claim 1 in which the diisocyanate is selected from the group consisting of isophorone diisocyanate, an intermediate made from a 36-carbon dimer aliphatic dibasic acid, and a polyfunctional isocyanate.

3. The process according to claim 1 in which the reaction product of ε-caprolactone, sebacic acid and propylene glycol is reacted with a polyfunctional isocyanate.

4. The process according to claim 1 in which the reaction product of ε-caprolactone, sebacic acid and 1,3-butane diol is reacted with a polyfunctional isocyanate.

5. A polyurethane binder for use in a solid propellant comprising the reaction product of a diisocyanate and a block or sequenced co-polyester diol produced by the process of claim 1 and having the structural formula $$H(OR_3COOR_4CO)_xOCH_2CH_2O[CO(CH_2)_5O]_yH \qquad I$$

wherein $R_3$ is the residual structure of a diol of structural formula II $$HO-R-OH \qquad II$$

in which R is an alkyl group containing 1 to 8 carbon atoms or an alkyl group containing 1–12 carbon atoms having a nitrogen atom in its backbone; and $R_4$ is the residual structure of a diacid of structural formula III $$HOOC(CH_2)_mCOOH \qquad III$$

in which m is an integer from 1 to 36; x is an integer from about 1 to 10; and y is an integer from about 1 to 10.

6. The polyurethane binder according to claim 5 in which the diisocyanate is selected from the group consisting of isophorone, diisocyanate, and intermediate made from a 36-carbon dimer aliphatic dibasic acid, and a polyfunctional isocyanate.

7. The polyurethane binder composition according to claim 5 or 6 further including a plasticizer.

8. A polyurethane binder according to claim 7 in which the plasticizer is isodecyl pelargonate.

9. A co-polyester-urethane propellant comprising by weight about 70% of ammonium perchlorate, about 18% of finely divided aluminum, and about 12% of a binder as defined in claim 5.

* * * * *